US005886331A

United States Patent [19]

Lyons, Jr.

[11] Patent Number: 5,886,331

[45] Date of Patent: Mar. 23, 1999

[54] ELECTRONIC CALCULATOR FOR DETERMINING TRUCK DRIVER LOG BOOK VALUES

[76] Inventor: Michael J. Lyons, Jr., 207 Amherst Ct., Hillsborough, N.J. 08876

[21] Appl. No.: 752,174

[22] Filed: Nov. 18, 1996

[51] Int. Cl.[6] .............................. G06F 29/00; G06F 7/00; G06C 7/02; G08B 1/00

[52] U.S. Cl. .............................. 235/61 B; 235/145 R; 235/58 PS; 364/424; 340/309.15; 340/439

[58] Field of Search .............................. 235/61 B, 145 R, 235/58 PS; 340/309.15, 439; 364/424

[56] References Cited

U.S. PATENT DOCUMENTS

| | | | |
|---|---|---|---|
| 3,851,720 | 12/1974 | Williams, Jr. | 235/58 |
| 3,974,568 | 8/1976 | Linderman | 33/107 R |
| 4,545,022 | 10/1985 | Hughins | 235/145 R |
| 4,916,827 | 4/1990 | Rayburn | 33/563 |
| 5,184,303 | 2/1993 | Link | 364/449 |
| 5,633,622 | 5/1997 | Patterson | 340/309 |

*Primary Examiner*—Anita Pellman Gross
*Assistant Examiner*—Daniel St. Cyr

[57] ABSTRACT

An electronic calculator for determining truck driver log book values including a liquid crystal display. Also included is a conventional numeric keypad having a matrix of numeric keys for allowing the entering of value signals representative of whole numbers upon the successive depression of the numeric keys and subsequent depression of an enter key. Finally, control circuitry is adapted to store a value signal representative of the number of hours a truck driver worked during a day, to display on the liquid crystal display a date corresponding to the day, to display the liquid crystal display the hours the truck driver worked during the day, to automatically calculate and display on the liquid crystal display a sum of the hours worked by the driver during a first amount of previous days, to automatically calculate and display on the liquid crystal display a maximum of allowable working hours minus the sum of the hours worked by the driver during the first amount of previous days, and to automatically calculate and display on the liquid crystal display a sum of the hours worked by the driver during a second amount of previous days.

7 Claims, 3 Drawing Sheets

| DAY OF MONTH | HRS WORKED TODAY | TOTAL HRS WORKED LAST 6 or 7 DAYS | TOTAL HRS FOR TOMORROW | TOTAL HRS ON DUTY LAST 7 or 8 DAYS |
|---|---|---|---|---|
| 07 | 6.00 | 39.25 | 30.75 | 50.25 |

ELECTRONIC CALCULATOR FOR DETERMINING TRUCK DRIVER LOG BOOK VALUES

BACKGROUND OF THE INVENTION

1. Field of the Invention

The present invention relates to an electronic calculator for determining truck driver log book values and more particularly pertains to allowing a truck driver to conveniently transcribe information required for an official driver's log monthly summary sheet upon entering the amount of hours worked in a current day.

2. Description of the Prior Art

The use of log books is known in the prior art. More specifically, log books heretofore devised and utilized for the purpose of tracking a driver's hours are known to consist basically of familiar, expected and obvious structural configurations, notwithstanding the myriad of designs encompassed by the crowded prior art which have been developed for the fulfillment of countless objectives and requirements.

Official truck driver daily log books were developed by the Department of Transportation for combating the increased possibility of accidents associated with driver fatigue. To accomplish such, the Department of Transportation sets a limit of the amount of hours a driver may drive in a given number of days(i.e. 70 hours/8 days or 60 hours/7 days) and requires that the log book which contains the number of hours a driver has worked in a given time period be kept up to date. This rule especially applies to the monthly summary sheet of the log book which is subject to periodic checking by officials. Basically, the summary sheet requires a driver to enter in a first column thereof the number of hours driven in the current day and further calculate and enter in a second column thereof the sum of hours driven in the last 6 or 7 days. The driver must also enter in a third column the number of hours he or she may drive during the next day by subtracting the foregoing sum of hours driven from the associated limit. Finally, the driver must also calculate and enter in a fourth column thereof the sum of hours driven in the last 7 or 8 days. Since drivers are usually fatigued at the cessation of a shift, such calculations are tedious and subject to mistakes which may cost the driver his or her job.

The only pertinent reference which attempts to aid a driver in making such calculations and filling out the monthly summary chart is U.S. Pat. No. 4,916,827 to Rayburn. Such reference discloses a manual guide device for making entries in a trucker's log book. While such device indicates to the user the necessary calculations, it still requires the driver to perform them.

In this respect, the electronic calculator for determining truck driver log book values according to the present invention substantially departs from the conventional concepts and designs of the prior art, and in so doing provides an apparatus primarily developed for the purpose of allowing a truck driver to conveniently transcribe information required for an official driver's log monthly summary sheet upon entering the amount of hours worked in a current day.

Therefore, it can be appreciated that there exists a continuing need for a new and improved electronic calculator for determining truck driver log book values which can be used for allowing a truck driver to conveniently transcribe information required for an official driver's log monthly summary sheet upon entering the amount of hours worked in a current day. In this regard, the present invention substantially fulfills this need.

SUMMARY OF THE INVENTION

In view of the foregoing disadvantages inherent in the known types of log books now present in the prior art, the present invention provides an improved electronic calculator for determining truck driver log book values. As such, the general purpose of the present invention, which will be described subsequently in greater detail, is to provide a new and improved electronic calculator for determining truck driver log book values which has all the advantages of the prior art and none of the disadvantages.

To attain this, the present invention essentially comprises a rectilinear configuration. As shown in FIG. 1, the housing has a top face, a bottom face, and a thin periphery. The housing further includes a coupling plate with an inverted U-shaped configuration coupled to and spaced from the bottom face thereof. By this structure, the housing may be releasably coupled with a prong fixed to a dashboard of a truck. Further provided is a first liquid crystal display situated adjacent a top edge of the housing. As shown in FIG. 1, the first liquid crystal display has a first column situated adjacent a left edge of the display for displaying a two digit number. A second column is situated adjacent the first column for displaying a four digit number with two decimal places. Also for displaying a four digit number with two decimal places, a third column is situated adjacent the second column. A fourth column is situated adjacent the third column for displaying a four digit number with two decimal places. Lastly, a fifth column is situated adjacent the fourth column for displaying a four digit number with two decimal places. It is imperative that the first liquid crystal display be representative of a row of a monthly summary sheet table of an official driver's daily log and accordingly have indicia printed adjacent each column which corresponds with identical indicia found on the log. Further provided is a second liquid crystal display situated adjacent a bottom edge of the housing. Such display is adapted to display a date thereon. Situated between the first and second liquid crystal display is a conventional numeric keypad. Ideally, the keypad is situated adjacent a left edge of the housing. As shown in FIG. 1, the numeric keypad has a matrix of numeric keys for allowing the entering of numeric signals upon the successive depression of the numeric keys and subsequent depression of an enter key. Such numeric signals are representative of whole numbers. Associated therewith is a plurality of fraction keys situated within a column adjacent the numeric keypad. The fraction keys include a ¼ key, a ½ key, and a ¾ key for allowing the entering of fraction signals upon the depression of one of the fraction keys and subsequent depression of the enter key. Unlike the numeric signals, the fraction signals are representative of corresponding fractions. In use, the numeric keys and the fraction keys may be used in conjunction to enter value signals representative of a combination of whole numbers and fractions. Also included is a plurality of miscellaneous keys situated within a column adjacent a right edge of the housing. The miscellaneous keys include a previous day key for transmitting a previous day signal, a next day key for transmitting a next day signal, and a new month key for transmitting a new month signal. As shown in FIGS. 3 and 5, memory is included which is situated within the housing. The memory is adapted for storing the signals entered via the keys. Lastly, control circuity is also situated within the housing. The control circuitry is electrically connected to the first liquid crystal display, the second liquid crystal display, the numeric keypad, the fraction keys, the miscellaneous keys, the memory means, and a power source. In operation, the control circuitry is adapted to store in the memory a value signal representative of the number of hours a truck driver worked during a day. The control circuitry is further adapted to display on the second liquid crystal display a date corresponding to the day. In addition, the control circuitry is designed to display on the second column of the first liquid crystal display the hours the truck driver worked during the day. Also, the control circuitry is constructed so as to automatically calculate and display on the third column of the first liquid crystal display a sum of the hours worked by the driver during a first amount of previous days. Finally, the control circuitry is adapted to automatically calculate and display on the fourth column of the first liquid crystal display a maximum of allowable working hours minus the sum of the hours worked by the driver during the first amount of previous days and to automatically calculate and display on the fifth column of the first liquid crystal display a sum of the hours worked by the driver during a second amount of previous days.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronic calculator for determining truck driver log book values which has all the advantages of the prior art log books and none of the disadvantages.

It is another object of the present invention to provide a new and improved electronic calculator for determining truck driver log book values which may be easily and efficiently manufactured and marketed.

It is a further object of the present invention to provide a new and improved electronic calculator for determining truck driver log book values which is of a durable and reliable construction.

An even further object of the present invention is to provide a new and improved electronic calculator for determining truck driver log book values which is susceptible of a low cost of manufacture with regard to both materials and labor, and which accordingly is then susceptible of low prices of sale to the consuming public, thereby making such electronic calculator for determining truck driver log book values economically available to the buying public.

Still yet another object of the present invention is to provide a new and improved electronic calculator for determining truck driver log book values which provides in the apparatuses and methods of the prior art some of the advantages thereof, while simultaneously overcoming some of the disadvantages normally associated therewith.

Still another object of the present invention is to allow a truck driver to conveniently transcribe information required for an official driver's log monthly summary sheet upon entering the amount of hours worked in a current day.

Lastly, it is an object of the present invention to provide a new and improved an electronic calculator for determining truck driver log book values including a liquid crystal display. Also included is a conventional numeric keypad having a matrix of numeric keys for allowing the entering of value signals representative of whole numbers upon the successive depression of the numeric keys and subsequent depression of an enter key. Finally, control circuitry is adapted to store a value signal representative of the number of hours a truck driver worked during a day, to display on the liquid crystal display a date corresponding to the day, to display the liquid crystal display the hours the truck driver worked during the day, to automatically calculate and display on the liquid crystal display a sum of the hours worked by the driver during a first amount of previous days, to automatically calculate and display on the liquid crystal display a maximum of allowable working hours minus the sum of the hours worked by the driver during the first amount of previous days, and to automatically calculate and display on the liquid crystal display a sum of the hours worked by the driver during a second amount of previous days.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
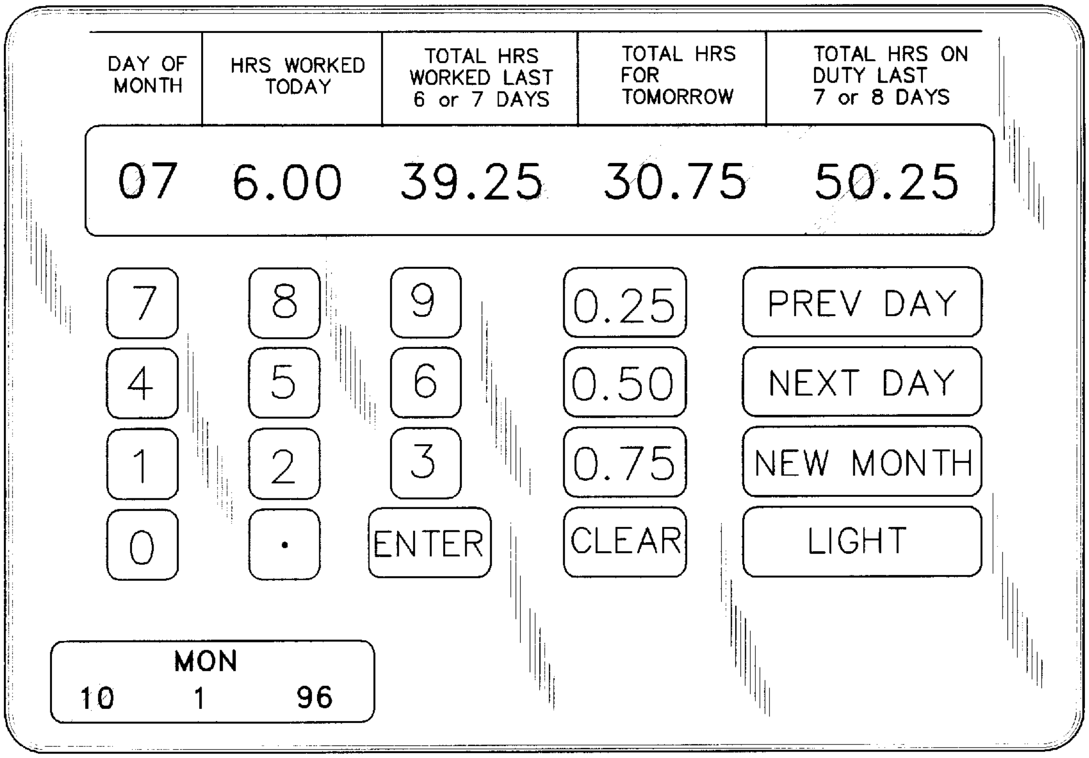
FIG. 1 is an illustration of the preferred embodiment of the electronic calculator for determining truck driver log book values constructed in accordance with the principles of the present invention.

With reference now to the drawings, and in particular to FIG. 1 thereof, a new and improved electronic calculator for determining truck driver log book values embodying the principles and concepts of the present invention and generally designated by the reference numeral 10 will be described.

The present invention, the new and improved electronic calculator for determining truck driver log book values, is comprised of a plurality of components. Such components in their broadest context include a housing, a first liquid crystal display, a second liquid display, a plurality of numeric keys, a plurality of fraction keys, a plurality of miscellaneous keys, memory, and control circuitry. Such components are individually configured and correlated with respect to each other so as to attain the desired objective.

More specifically, it will be noted that the system 10 of the present invention includes a housing 12 with a rectilinear configuration. As shown in FIG. 1, the housing has a top face, a bottom face, and a thin periphery. The housing further includes a coupling plate 14 with an inverted U-shaped configuration coupled to and spaced from the bottom face thereof. By this structure, the housing may be releasably coupled with a prong fixed to a dashboard of a truck.

Further provided is a first liquid crystal display 16 situated adjacent a top edge of the housing. As shown in FIG. 1, the first liquid crystal display has a first column 18 situated adjacent a left edge of the display for displaying a two digit number. A second column 20 is situated adjacent the first column for displaying a four digit number with two decimal places. Also for displaying a four digit number with two decimal places, a third column 22 is situated adjacent the second column. A fourth column 24 is situated adjacent the third column for displaying a four digit number with two decimal places. Lastly, a fifth column 26 is situated adjacent the fourth column for displaying a four digit number with two decimal places. It is imperative that the first liquid crystal display be representative of a row of a monthly summary sheet table of an official driver's daily log and accordingly have indicia 27 printed adjacent each column which corresponds with indicia found on the log.

Further provided is a second liquid crystal display 28 situated adjacent a bottom edge of the housing. Such display is adapted to display a date thereon.

Situated between the first and second liquid crystal display is a conventional numeric keypad 30. Ideally, the keypad is situated adjacent a left edge of the housing. As shown in FIG. 1, the numeric keypad has a matrix of numeric keys 32 for allowing the entering of numeric signals upon the successive depression of the numeric keys and subsequent depression of an enter key. Such numeric signals are representative of whole numbers.

Associated therewith is a plurality of fraction keys 34 situated within a column adjacent the numeric keypad. The fraction keys include a ¼ key, a ½ key , and a ¾ key for allowing the entering of fraction signals upon the depression of one of the fraction keys and subsequent depression of the enter key. Unlike the numeric signals, the fraction signals are representative of corresponding fractions. In use, the numeric keys and the fraction keys may be used in conjunction to enter value signals representative of a combination of whole numbers and fractions. If an error is made, a clear key 37 may be employed to obviate such error.

Also included is a plurality of miscellaneous keys 36 situated within a column adjacent a right edge of the housing. The miscellaneous keys include a previous day key 38 for transmitting a previous day signal, a next day key 40 for transmitting a next day signal, and a new month key 42 for transmitting a new month signal. As an option, a light key 43 may be included for lighting the first and second display for a period of approximately 30–45 seconds upon the instantaneous depression thereof. Such feature is very beneficial in view of the fact that a driver usually enters information into the official log book at night.

Figure 3:
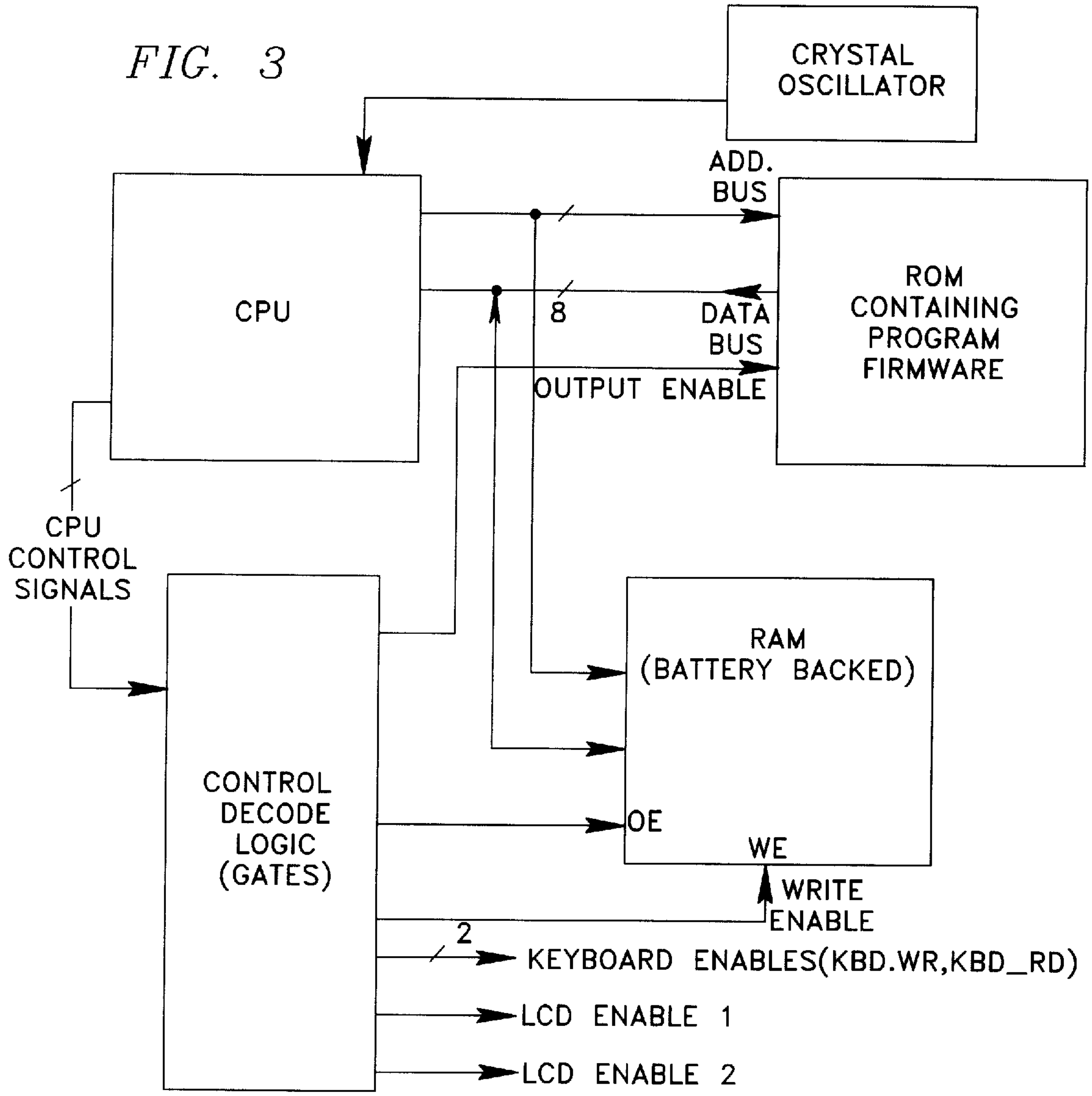
FIG. 3 is a schematic diagram depicting the various components associated with the control circuitry of the present invention.
Figure 5:
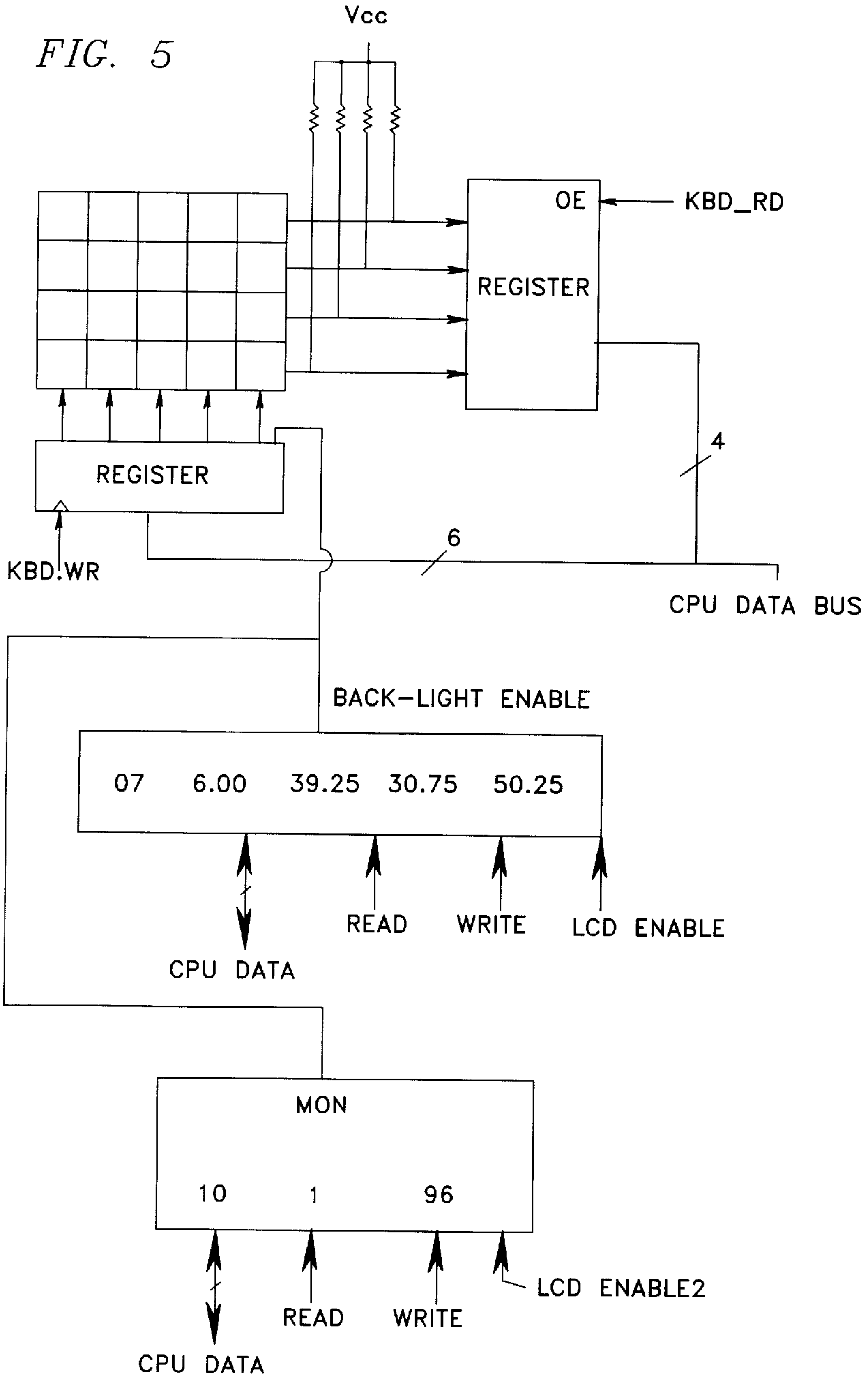
FIG. 5 is another schematic diagram depicting additional components associated with the control circuitry of the present invention.

As shown in FIGS. 3 and 5, memory 44 is included which is situated within the housing. The memory is adapted for storing the signals entered via the keys.

Lastly, control circuitry 46 is also situated within the housing. The control circuitry is electrically connected to the first liquid crystal display, the second liquid crystal display, the numeric keypad, the fraction keys, the miscellaneous keys, the memory means, and a power source. In operation, the control circuitry is adapted to store in the memory a value signal representative of the number of hours a truck driver worked during a day. The control circuitry is further adapted to display on the second liquid crystal display a date corresponding to the day. In addition, the control circuitry is designed to display on the second column of the first liquid crystal display the hours the truck driver worked during the day. Also, the control circuitry is constructed so as to automatically calculate and display on the third column of the first liquid crystal display a sum of the hours worked by the driver during a first amount of previous days. It should be noted that such first amount includes the current day. Finally, the control circuitry is adapted to automatically calculate and display on the fourth column of the first liquid crystal display a maximum of allowable working hours minus the sum of the hours worked by the driver during the first amount of previous days and to automatically calculate and display on the fifth column of the first liquid crystal display a sum of the hours worked by the driver during a second amount of previous days. It should be noted that such second amount includes the current day.

Since a trucker may be required to drive only 70 hours in a 8 day period or only 60 hrs in a 7 day period, a switch 48 is included to accommodate both situations. In a first orientation, the first amount of previous days is 7, the second amount of previous days is 8, and the maximum amount of allowable working hours is 70. Such values correspond to the 70 hours per 8 day period requirement. In yet another orientation, the switch 48 is adapted to assign the first amount of previous days as 6, the second amount of previous days as 7, and the maximum amount of allowable working hours as 60. As an option, the switch may further be adapted to accommodate the situation wherein the trucker may only drive 80 hours in a 8 day period, as is law in areas such as California.

The method associated with the present invention is afforded by first providing the foregoing components. In use, the user first enters a value signal which is representative of the number of hours a truck driver worked during the first amount of previous days excluding the current day. Such is accomplished by the depression of the corresponding numeric keys and fraction key and subsequently pressing enter. Next, the user enters a value signal which is representative of the number of hours a truck driver worked during the current day by the depression of the corresponding numeric keys and fraction key and subsequently pressing enter. Thereafter, the control circuitry is provided with adequate information to display all calculated information on the first liquid crystal display whereat the user may transcribe the values displayed in the columns of the first liquid crystal display to a corresponding a row of the monthly summary sheet of the official driver's daily log.

To allow the user to view information from previous days, the miscellaneous keys may be utilized. Upon the receipt of the previous day signal, the control circuitry is adapted to depict all information of a previous date. The control circuitry is also adapted to depict all information of a next date, if available, upon the receipt of the next day signal. Upon the receipt of the new month signal, the control circuitry depicts a new month and indicates such in the second liquid crystal display. If the hours worked are available in memory for the first amount of previous days is available, the control circuity is adapted to employ such numbers in the calculation of the official log book information. However, if such information is unavailable, as in the case of the utilization of the present invention for the first time, the control circuitry prompts the user to enter the necessary information. By this design, a user may scroll through past information and fill in any row of the monthly summary sheet of the official driver's daily log in which there might be a gap or mistake present.

Figure 2:
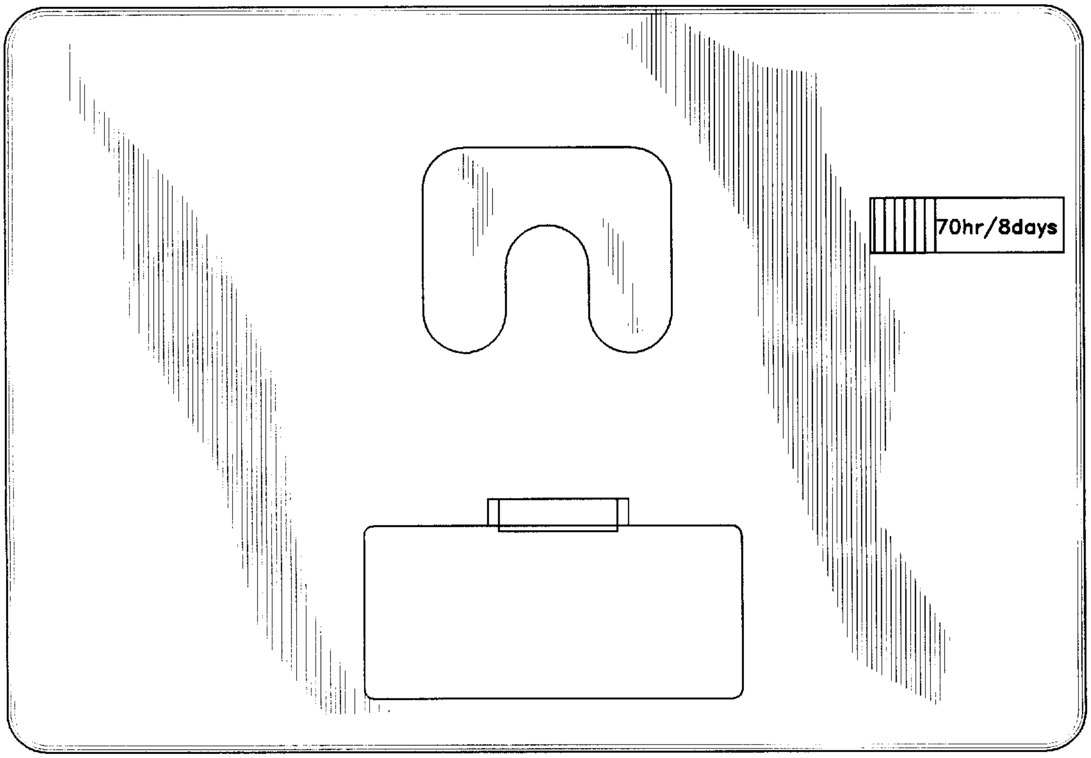
FIG. 2 is a rear view of the present invention.
Figure 4:
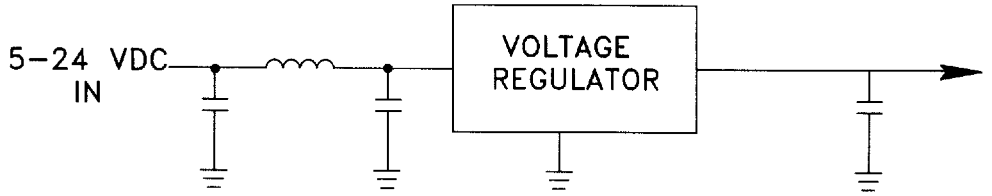
FIG. 4 is a schematic diagram depicting the various components associated with the power regulator of the present invention.

As shown in FIGS. 3–5, the control circuitry comprises many components utilized in conventional computers but which are altered to suit the requirements of the present invention. As can be seen in FIG. 5, the liquid crystal displays are equipped with the proper number of character spaces. The keys are provided with properly sized registers containing the corresponding value or command. Further the CPU data bus is also properly sized. With reference to FIG. 3, read only memory is provided for containing all necessary commands such as the necessary substraction and addition functions. All of the foregoing functions are employable by the CPU when retrieved via a data bus and conventional address calling system. Random Access Memory is also available for storage of the information associated with each date. Further included is Control Decode Logic for interfacing with the ROM, RAM, and peripherals, namely the keys and liquid crystal displays. For powering purposes, a voltage regulator system is provided. See FIG. 4. Such system is adapted to accommodate a power input comparable to that of a conventional automobile battery. It should also be noted that the RAM has an additional battery back-up, as shown in FIG. 2, in case the conventional power supply fails.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electronic calculator for determining truck driver log book values comprising, in combination:

a housing with a rectilinear configuration having a top face, a bottom face, and a thin periphery, the housing further having a coupling plate with an inverted U-shaped configuration coupled to and spaced from the bottom face thereof for coupling with a prong fixed to a dashboard of a truck;

a first liquid crystal display situated adjacent a top edge of the front face of the housing and having a first column situated adjacent a left edge of the display for displaying a two digit number, a second column situated adjacent the first column for displaying a four digit number with two decimal places, a third column situated adjacent the second column for displaying a four digit number with two decimal places, a fourth column situated adjacent the third column for displaying a four digit number with two decimal places, and a fifth column situated adjacent the fourth column for displaying a four digit number with two decimal places, wherein the first liquid crystal display is representative of a row of a monthly summary sheet table of an official driver's daily log;

a second liquid crystal display situated adjacent a bottom edge of the front face of the housing and adapted to display a date thereon;

a conventional numeric keypad situated between the first liquid crystal display and the second liquid crystal display adjacent a left edge of the housing, the numeric keypad having a matrix of numeric keys for allowing the entering of numeric signals representative of whole numbers upon the successive depression of the numeric keys and subsequent depression of an enter key;

a plurality of fraction keys situated within a column adjacent the numeric keypad, the fraction keys including a ¼ key, a ½ key, and a ¾ key for allowing the entering of fraction signals representative of corresponding fractions upon the depression of one of the fraction keys and subsequent depressing the enter key, whereby the numeric keys and the fraction keys may be used in conjunction to enter value signals representative of a combination of whole numbers and fractions;

a plurality of miscellaneous keys situated within a column adjacent a right edge of the housing, the miscellaneous keys including a previous day key for transmitting a previous day signal, a next day key for transmitting a next day signal, and a new month key for transmitting a new month signal;

memory means situated within the housing for storing the signals entered via the keys; and control means situated within the housing and electrically connected to the first liquid crystal display, the second liquid crystal display, the numeric keypad, the fraction keys, the miscellaneous keys, the memory means, and a power source, the control means adapted to store in the memory means a value signal representative of the number of hours a truck driver worked during a day, to display on the second liquid crystal display a date corresponding to the day, to display on the second column of the first liquid crystal display the hours the truck driver worked during the day, to automatically calculate and display on the third column of the first liquid crystal display a sum of the hours worked by the driver during a first amount of previous days, to automatically calculate and display on the fourth column of the first liquid crystal display a maximum of allowable working hours minus the sum of the hours worked by the driver during the first amount of previous days, and to automatically calculate and display on the fifth column of the first liquid crystal display a sum of the hours worked by the driver during a second amount of previous days;

whereby a user may utilize the miscellaneous keys to view the hours the truck driver worked during the day, the sum of the hours worked by the driver during the first amount of previous days, the maximum of allowable wording hours minus the sum of the hours worked by the driver during the first amount of previous days, and the sum of the hours worked by the driver during the second amount of previous days corresponding to the day displayed on the second liquid crystal display thereby allowing the driver to transcribe the values directly from the first liquid crystal display to a corresponding a row of the monthly summary sheet of the official driver's daily log.

2. An electronic calculator for determining truck driver log book values comprising:

a housing with a rectilinear configuration having a top face, a bottom face, and a thin periphery;

a first liquid crystal display situated adjacent a top edge of the front face of the housing and having a first column situated adjacent a left edge of the display for displaying a two digit number, a second column situated adjacent the first column for displaying a four digit number with two decimal places, a third column situated adjacent the second column for displaying a four digit number with two decimal places, a fourth column situated adjacent the third column for displaying a four digit number with two decimal places, and a fifth column situated adjacent the fourth column for displaying a four digit number with two decimal places, wherein the first liquid crystal display is representative of a row of a monthly summary sheet table of an official driver's daily log;

a conventional numeric keypad having a matrix of numeric keys for allowing the entering of numeric signals representative of whole numbers upon the successive depression of the numeric keys and subsequent depression of an enter key, whereby the numeric keys may be used to enter value signals;

memory means situated within the housing for storing the signals entered via the keys; and control means situated within the housing and electrically connected to the first liquid crystal display, the numeric keypad, the memory means, and a power source, the control means adapted to store in the memory means a value signal representative of the number of hours a truck driver worked during a day, to display on the first column of the first liquid crystal display a date corresponding to the day, to display on the second column of the first liquid crystal display the hours the truck driver worked during the day, to automatically calculate and display on the third column of the first liquid crystal display a sum of the hours worked by the driver during a first amount of previous days, to automatically calculate and display on the fourth column of the first liquid crystal display a maximum of allowable working hours minus the sum of the hours worked by the driver during the first amount of previous days, and to automatically calculate and display on the fifth column of the first liquid crystal display a sum of the hours worked by the driver during a second amount of previous days a second liquid crystal display situated adjacent a bottom edge of the front face of the housing and adapted to display a date thereon.

3. An electronic calculator for determining truck driver log book values as set forth in claim 2 wherein the housing further has a coupling plate with an inverted U-shaped configuration coupled to and spaced from the bottom face thereof for coupling with a prong fixed to a dashboard of a truck.

4. An electronic calculator for determining truck driver log book values as set forth in claim 2 and further including a plurality of fraction keys situated within a column adjacent the numeric keypad, the fraction keys including a ¼ key, a ½ key, and a ¾ key for allowing the entering of fraction signals representative of corresponding fractions upon the depression of one of the fraction keys and subsequently depressing the enter key, whereby the numeric keys and the fraction keys may be used in conjunction to enter value signals representative of a combination of whole numbers and fractions.

5. An electronic calculator for determining truck driver log book values as set forth in claim 2 and further including a plurality of miscellaneous keys situated within a column adjacent a right edge of the housing, the miscellaneous keys including a previous day key for transmitting a previous day signal, a next day key for transmitting a next day signal, and a new month key for transmitting a new month signal, whereby a user may utilize the miscellaneous keys to view the hours the truck driver worked during the day, the sum of the hours worked by the driver during a first amount of previous days, the maximum of allowable wording hours minus the sum of the hours worked by the driver during the first amount of previous days, and the sum of the hours worked by the driver during a second amount of previous days corresponding to various days.

6. A method of calculating and transcribing truck driver work log information for a monthly summary sheet table of an official driver's daily log comprising the steps of:

providing a housing with a rectilinear configuration having a top face, a bottom face, and a thin periphery;

providing a coupling plate with an inverted U-shaped configuration coupled to and spaced from the bottom face of the housing for coupling with a prong fixed to a dashboard of a truck;

providing a first liquid crystal display situated adjacent a top edge of a front face of the housing and having a first column situated adjacent a left edge of the display for displaying a two digit number, a second column situated adjacent the first column for displaying a four digit number with two decimal places, a third column situated adjacent the second column for displaying a four digit number with two decimal places, a fourth column situated adjacent the third column for displaying a four digit number with two decimal places, and a fifth column situated adjacent the fourth column for displaying a four digit number with two decimal places, wherein the first liquid crystal display is representative of a row of a monthly summary sheet table of an official driver's daily log;

providing a second liquid crystal display situated adjacent a bottom edge of a front face of the housing and adapted to display a date thereon;

providing a conventional numeric keypad situated between the first liquid crystal display and the second liquid crystal display adjacent a left edge of the housing, the numeric keypad having a matrix of numeric keys for allowing the entering of numeric signals representative of whole numbers upon the successive depression of the numeric keys and subsequent depression of an enter key;

providing a plurality of fraction keys situated within a column adjacent the numeric keypad, the fraction keys including a ¼ key, a ½ key, and a ¾ key for allowing the entering of fraction signals representative of corresponding fractions upon the depression of one of the fraction keys and subsequently depressing the enter key, whereby the numeric keys and the fraction keys may be used in conjunction to enter value signals representative of a combination of whole numbers and fractions;

providing memory means situated within the housing for storing the signals entered via the keys;

providing control means situated within the housing and electrically connected to the first liquid crystal display, the second liquid crystal display, the numeric keypad, the fraction keys, the miscellaneous keys, the memory means, and a power source, the control means adapted to store in the memory means a value signal representative of the number of hours a truck driver worked during a day, to display on the second liquid crystal display a date corresponding to the day, to display on the second column of the first liquid crystal display the hours the truck driver worked during the day, to automatically calculate and display on the third column of the first liquid crystal display a sum of the hours worked by the driver during a first amount of previous days, to automatically calculate and display on the fourth column of the first liquid crystal display a maximum of allowable working hours minus the sum of the hours worked by the driver during the first amount of previous days, and to automatically calculate and display on the fifth column of the first liquid crystal display a sum of the hours worked by the driver during a second amount of previous days;

entering a value signal by user which is representative of the number of hours a truck driver worked during the first amount of previous days excluding a current day by the depression of the corresponding numeric keys and fraction keys and subsequently pressing enter;

entering a value signal by user which is representative of the number of hours a truck driver worked during the current day by the depression of the corresponding numeric keys and fraction keys and subsequently pressing enter; and transcribing the values displayed in the columns of the first liquid crystal display to a corresponding a row of the monthly summary sheet of the official driver's daily log.

7. A method of calculating and transcribing truck driver work log information as set forth in claim 6 and further comprising the steps of:

providing a plurality of miscellaneous keys situated within a column adjacent a right edge of the housing, the miscellaneous keys including a previous day key for transmitting a previous day signal, a next day key for transmitting a next day signal, and a new month key for transmitting a new month signal; and utilizing the miscellaneous keys to view the hours the truck driver worked during the day, the sum of the hours worked by the driver during the first amount of previous days, the maximum of allowable wording hours minus the sum of the hours worked by the driver during the first amount of previous days, and the sum of the hours worked by the driver during a second amount of previous days corresponding to various days.

* * * * *